United States Patent
Bathurst

(10) Patent No.: US 8,769,789 B2
(45) Date of Patent: Jul. 8, 2014

(54) DIE FOR RIVET MACHINE

(75) Inventor: Robert G. Bathurst, Lenox, MI (US)

(73) Assignee: BTM Corporation, Marysville, MI (US)

(*) Notice: Subject to any disclaimer, the term of this patent is extended or adjusted under 35 U.S.C. 154(b) by 488 days.

(21) Appl. No.: 13/162,986

(22) Filed: Jun. 17, 2011

(65) Prior Publication Data

US 2012/0317767 A1    Dec. 20, 2012

(51) Int. Cl.
- *B23P 11/00* (2006.01)
- *B23P 19/04* (2006.01)
- *B23P 19/00* (2006.01)
- *B23P 19/02* (2006.01)

(52) U.S. Cl.
CPC ............... *B23P 19/00* (2013.01); *B23P 19/02* (2013.01); *B23P 11/00* (2013.01)
USPC ....... 29/243.53; 29/243.5; 29/243; 29/243.58

(58) Field of Classification Search
CPC ............. B23P 1/00; B23P 19/00; B23P 11/00
USPC ......... 29/243.53–243.58, 243.5; 269/6, 3, 32, 269/228

See application file for complete search history.

(56) References Cited

U.S. PATENT DOCUMENTS

| | | |
|---|---|---|
| 3,942,235 A | 3/1976 | Goodsmith et al. |
| 4,130,922 A | 12/1978 | Koett |
| 4,543,865 A | 10/1985 | Kramski |
| 5,339,983 A | 8/1994 | Caple |
| 5,465,868 A | 11/1995 | Bonomi |
| 5,636,426 A | 6/1997 | Luckhardt et al. |
| 5,678,970 A | 10/1997 | Caulk |
| 5,737,819 A | 4/1998 | Sawdon et al. |
| 5,752,305 A | 5/1998 | Cotterill et al. |
| 5,953,813 A | 9/1999 | Sickels et al. |
| 6,018,863 A | 2/2000 | Altrock |
| 6,263,561 B1 | 7/2001 | Sickels et al. |
| 6,592,015 B1 | 7/2003 | Gostylla et al. |
| 6,631,827 B2 | 10/2003 | Goodsmith et al. |
| 6,925,698 B2 | 8/2005 | Goodsmith et al. |
| 6,957,483 B2 | 10/2005 | Woods |
| 6,968,939 B1 | 11/2005 | Mauer et al. |
| 7,475,468 B2 | 1/2009 | Mauer et al. |
| 7,559,133 B2 | 7/2009 | Chitty et al. |

(Continued)

OTHER PUBLICATIONS

AKH System Manual published or offered for sale prior to Jun. 2011, 17 pages.

(Continued)

*Primary Examiner* — Lee D Wilson
*Assistant Examiner* — Seahee Yoon
(74) *Attorney, Agent, or Firm* — Price Heneveld LLP

(57) ABSTRACT

A rivet machine is provided. The rivet machine employs a die including a die body that has an inner wall with a pair of retaining ribs or projections extending inwardly therefrom. In use, the rivet pushes a slug from a workpiece within which it is mounted and into an opening of the die. The projections engage and retain the slug within the inner wall. According to further aspects, the pair of retaining ribs are diametrically opposed around the inner wall. Each of the retaining ribs has two converging surfaces that form an angle of between 90 and 150 degrees. In yet another aspect, the projections can be discontinuous such that a first retaining rib is longitudinally offset on the inner wall from a second retaining rib.

28 Claims, 9 Drawing Sheets

(56) References Cited

U.S. PATENT DOCUMENTS

| | | | |
|---|---|---|---|
| 7,596,858 B2 * | 10/2009 | Opper | 29/716 |
| 7,748,097 B1 | 7/2010 | Matthews et al. | |
| 7,752,739 B2 | 7/2010 | Mauer et al. | |
| 7,849,579 B2 | 12/2010 | Craythorn et al. | |
| 2007/0274804 A1 | 11/2007 | Woods | |
| 2008/0066286 A1 * | 3/2008 | Saathoff | 29/243.53 |
| 2011/0173803 A1 | 7/2011 | Naito et al. | |

OTHER PUBLICATIONS

AKH FAS-NER Drawing No. WIS-146, Jun. 2011, 1 page.

Dayton Slug Control System, Copyrighted 2003, Dayton Progress Corporation, 2 pages.

* cited by examiner

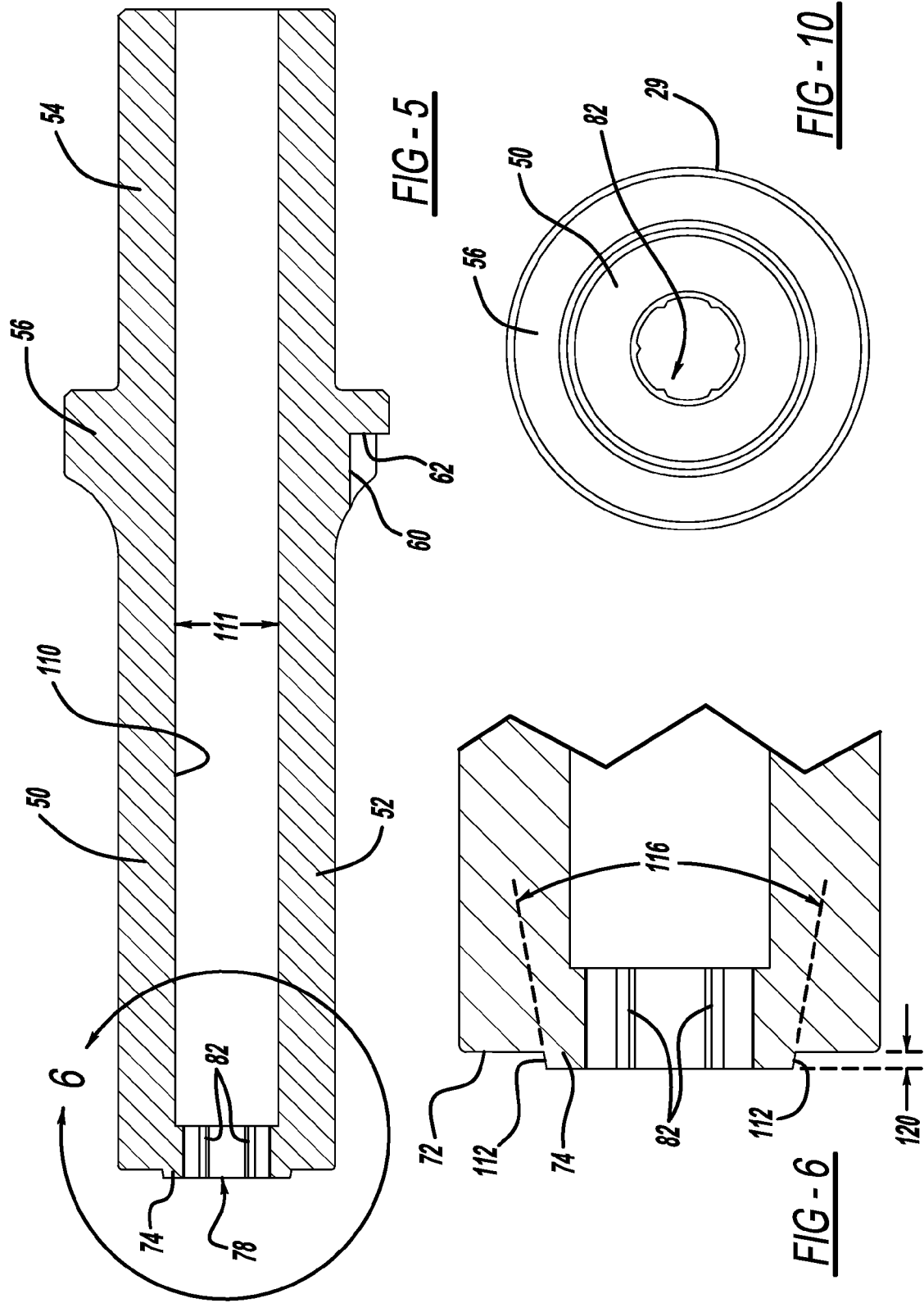

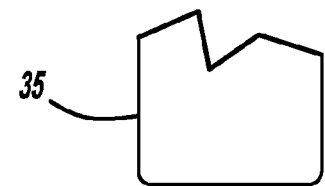
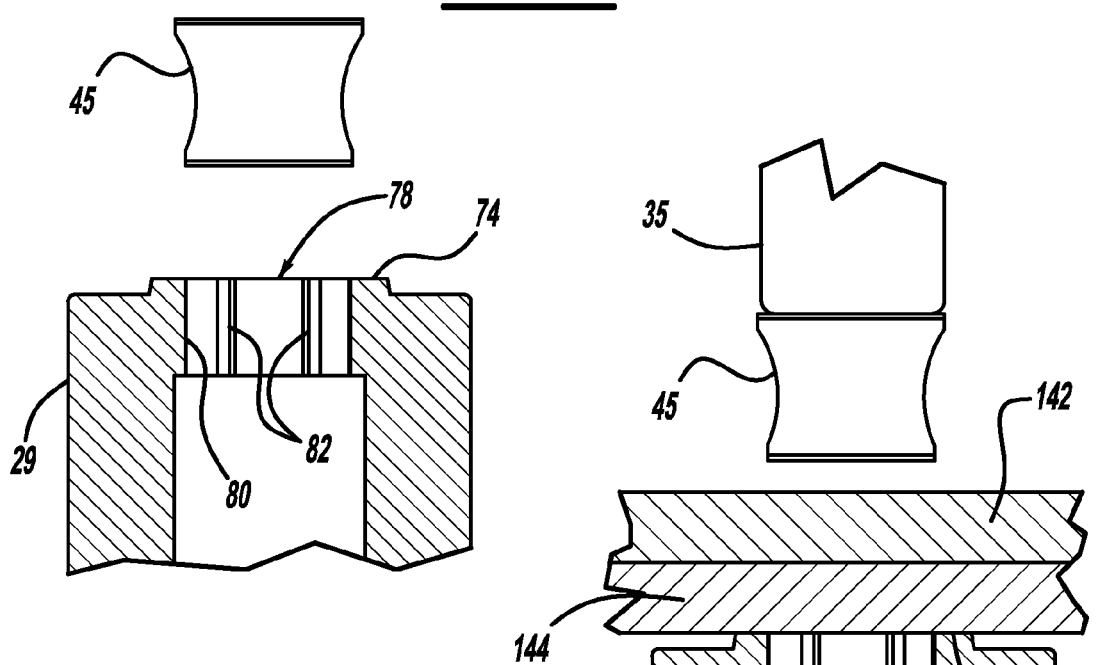
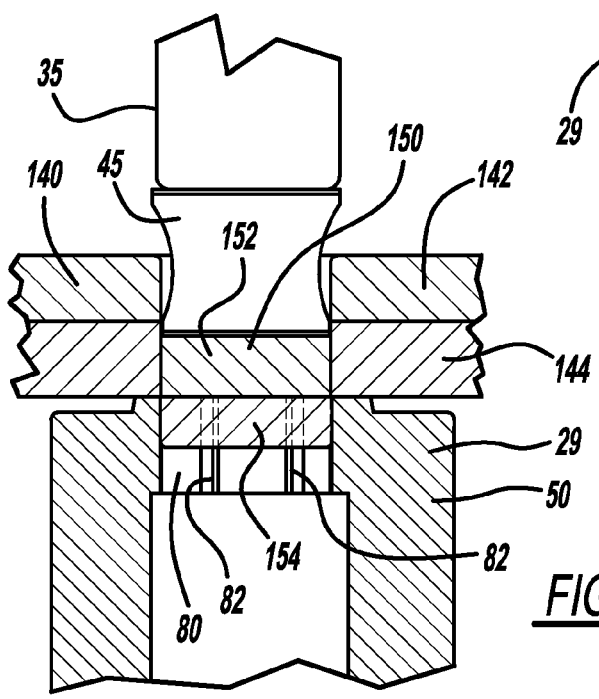

DIE FOR RIVET MACHINE

FIELD

This present invention relates generally to a fastener machine and more particularly to a die for a rivet machine.

Rivet machines generally include a ram or punch that is configured to engage and drive a rivet through workpieces to join the workpieces together. In general, when the rivet is driven into the workpieces by the punch, the rivet will urge portions of the workpiece, or a slug, into an opening of the die to make room for the rivet. In some instances, the slug may unfavorably become attached or stuck to the workpiece and/or against the rivet. In such an event, the slug may be carried on the workpiece with the finished component and later fall off. In some examples, the slug may fall off of a workpiece that has been assembled into a completed product (such as a door of a vehicle) that could later cause mechanical problems and/or noise from rattling.

In accordance with the present invention, a rivet machine is provided. The rivet machine employs a die including a die body that has an inner wall with a pair of retaining ribs or projections extending inwardly therefrom. In use, the rivet pushes a slug from a workpiece within which it is mounted and into an opening of the die. The projections engage and retain the slug within the inner wall. According to further aspects, the pair of retaining ribs are diametrically opposed around the inner wall. Each of the retaining ribs has two converging surfaces that form an angle of between 90 and 150 degrees. In yet another aspect, the projections can be discontinuous such that a first retaining rib is longitudinally offset on the inner wall from a second retaining rib.

Further advantageous and areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The drawings described herein are for illustrative purposes only of selected embodiments and not all possible implementations, and are not intended to limit the scope of the present disclosure.

FIG. 5 is a longitudinal cross-sectional view of the die taken along line 5-5 of FIG. 4;

FIG. 6 is a detail view of an upper portion of the die of FIG. 5;

FIG. 10 is a bottom plan view of the die of FIG. 3;

FIGS. 11-15 illustrate an exemplary sequence for driving a rivet into first and second workpieces according to one example of the present teachings;

Corresponding reference numerals indicate corresponding parts throughout the several views of the drawings.

DETAILED DESCRIPTION

Example embodiments will now be described more fully with reference to the accompanying drawings.

Figure 1:
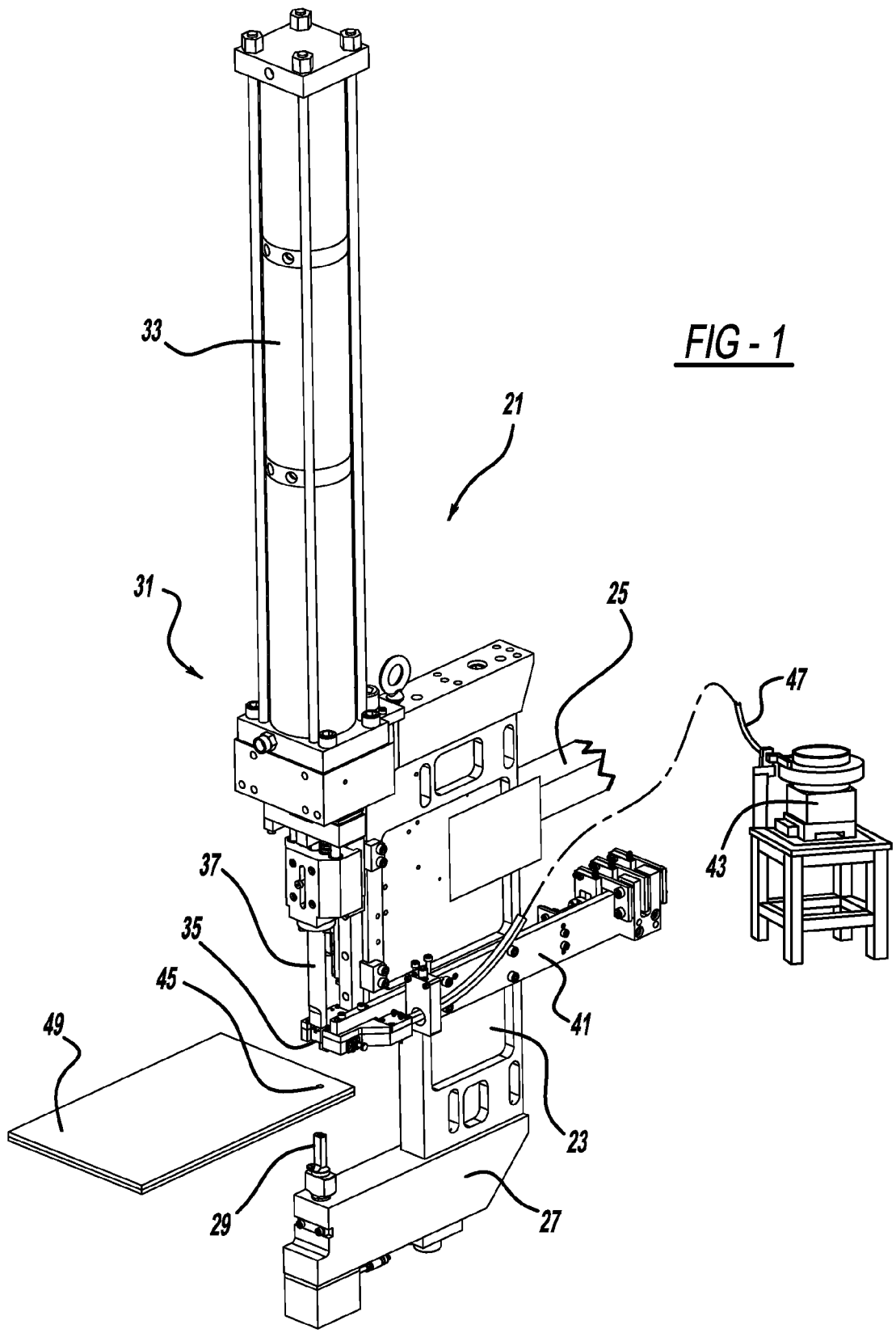
FIG. 1 is a perspective view showing a rivet machine.

Referring to FIG. 1, a rivet setting machine 21 includes a C-frame 23 which is mounted to an articulated robotic arm 25 for automated movement between various operating positions within an industrial factory. An anvil section 27 of C-frame 23 has a die 29 mounted thereon. A ram assembly 31 is mounted to the opposite end of C-frame 23 and includes an air-over-oil fluid actuated cylinder 33, a nose piece 35 and a linearly moving punch 37. Alternately, cylinder 33 can be solely hydraulically, pneumatically, or less preferably, servo-motor actuated. A rivet feeding mechanism 41 is mounted to a generally middle segment of C-frame 23 and is elongated in a direction generally perpendicular to the movement direction of punch 37.

A vibratory bowl 43 supplies individualized fasteners, such as a self-piercing rivet 45, to feeding mechanism 41 via a pneumatically pressurized and flexible hose 47. When multiple workpiece sheets 49 are inserted between punch 37 and die 29, punch 37 will thereafter push and set the rivet into the upper surface of the workpieces as they are being compressed against die 29. Self-piercing rivet 45 is preferably a solid (e.g., not hollow) rivet which punches out a blank or slug (150, FIG. 13) from the previously unpunched workpiece areas, whereafter the blanks are withdrawn through an aperture in die 29 as will be described in greater detail herein. The rivet ends are generally flush with the adjacent outside surfaces of workpieces 49. One such self-piercing rivet is disclosed in U.S. Pat. No. 4,130,922 entitled "Headless Riveting System" which issued to Koett on Dec. 26, 1978, which is incorporated by reference herein.

Figure 2:
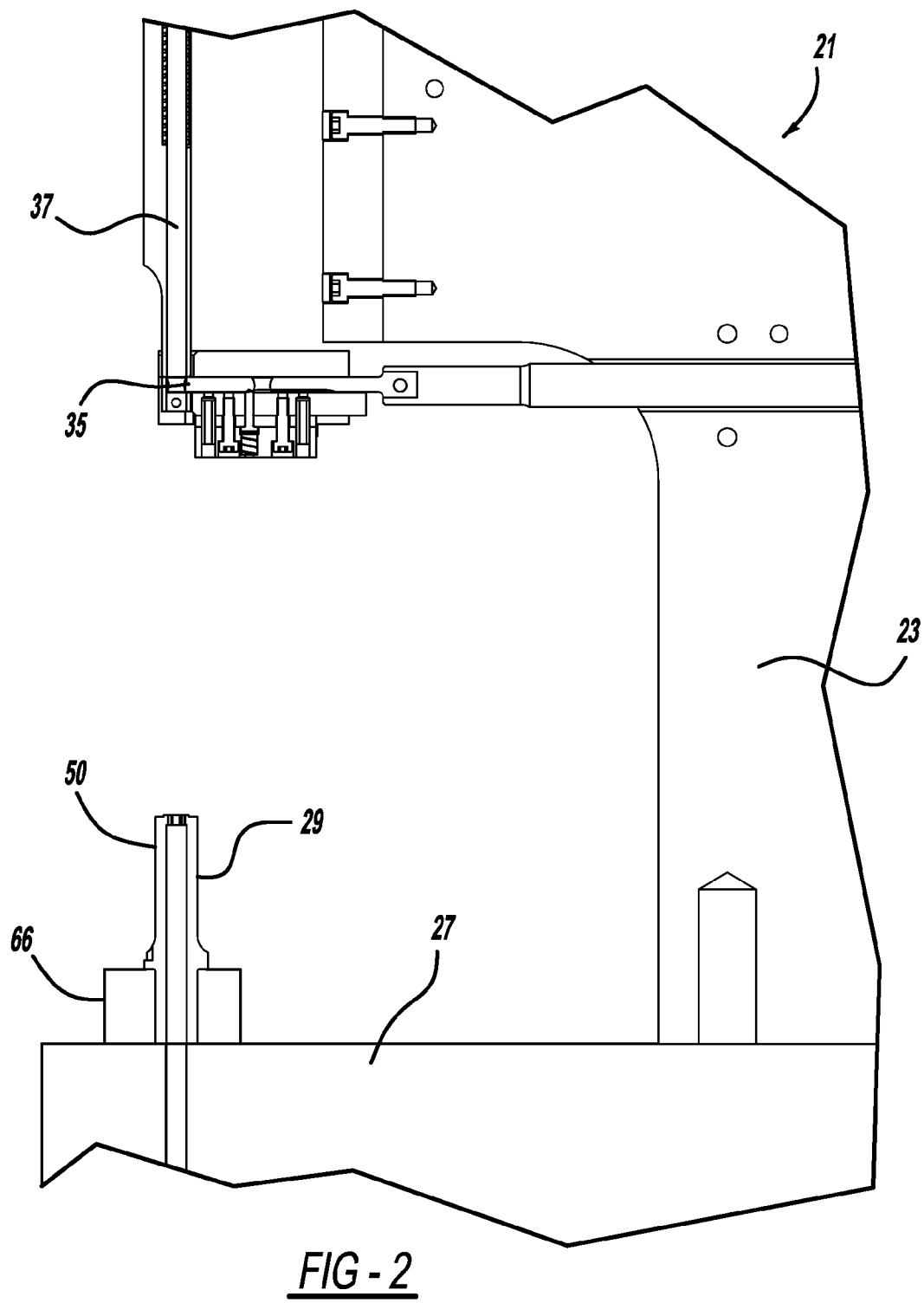
FIG. 2 is a partial cross-sectional view taken through the rivet machine of FIG. 1.
Figure 3:
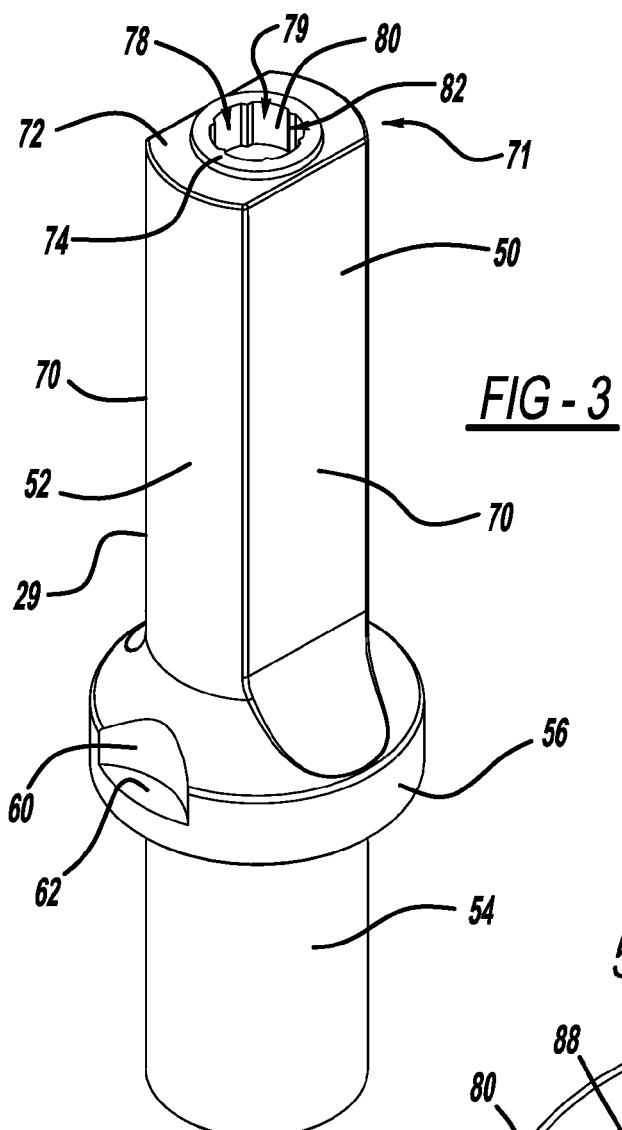
FIG. 3 is a perspective view of a die of the rivet machine shown in FIG. 1.

With particular reference now to FIGS. 3-9, the die 29 constructed in accordance with one example of the present teachings will be described in greater detail. The die 29 generally comprises a die body 50 having a main body portion 52 and a base portion 54. A transition between the main body portion 52 and the base portion 54 is generally provided by a skirt 56. The skirt 56 includes a relief 60 having a ledge 62. According to one example, the ledge 62 can be engaged by a head of a fastener (not specifically shown) that mechanically secures the die body 50 to a die block 66 provided on the anvil section 27 (See FIG. 2). The main body portion 52 generally includes flats 70 formed thereon. The main body portion 52 can further include a die button 71. The die button 71 generally includes an end surface 72 and a raised collar 74 extending proud therefrom.

The die body 50 defines an opening 78. The opening 78 can be generally defined by a bore 79 having an inner wall 80 having a generally cylindrical shape and defining an axis 81. The inner wall 80 of the die body 50 includes a plurality of retaining ribs or projections collectively identified at reference numeral 82. The projections 82 extend generally inwardly from the inner wall 80 of the die body 50. The projections 82 include a first pair of projections 84, a second pair of projections 86, and a third pair of projections 88. In the specific example shown, the projections of the respective pairs of projections 84, 86, and 88 are diametrically opposed on the inner wall 80. According to one example, the projections 82 may be formed on the inner wall 80 of the die body 50 by a wire electrical discharge machining (EDM) process.

Figure 4:
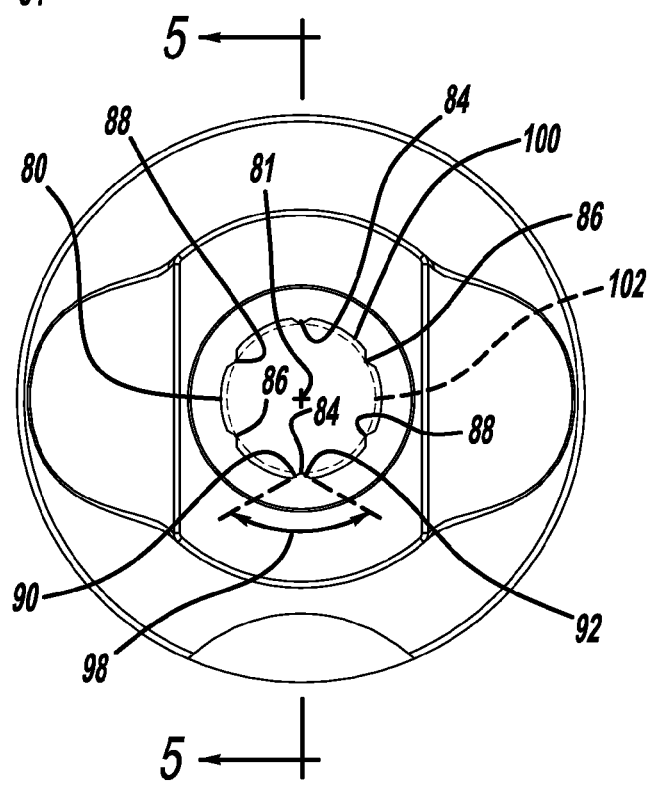
FIG. 4 is a top plan view of the die of FIG. 3.
Figure 7:
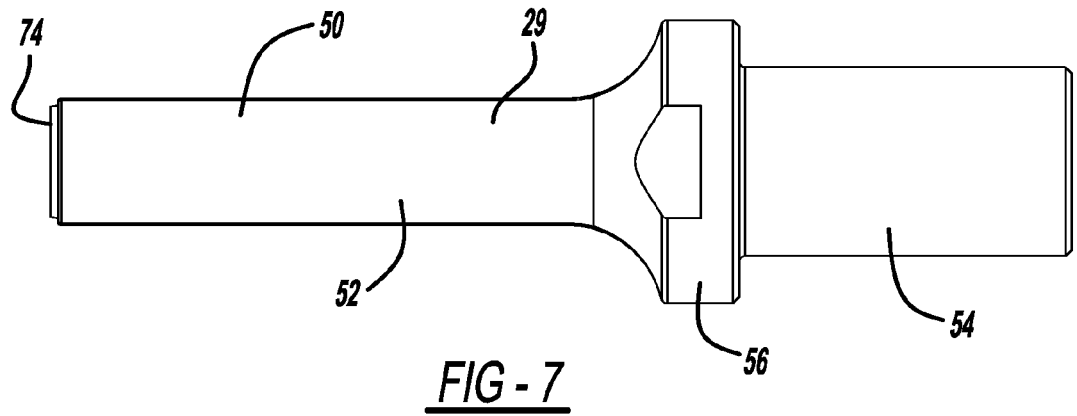
FIG. 7 is a first side view of the die of FIG. 3.
Figure 8:
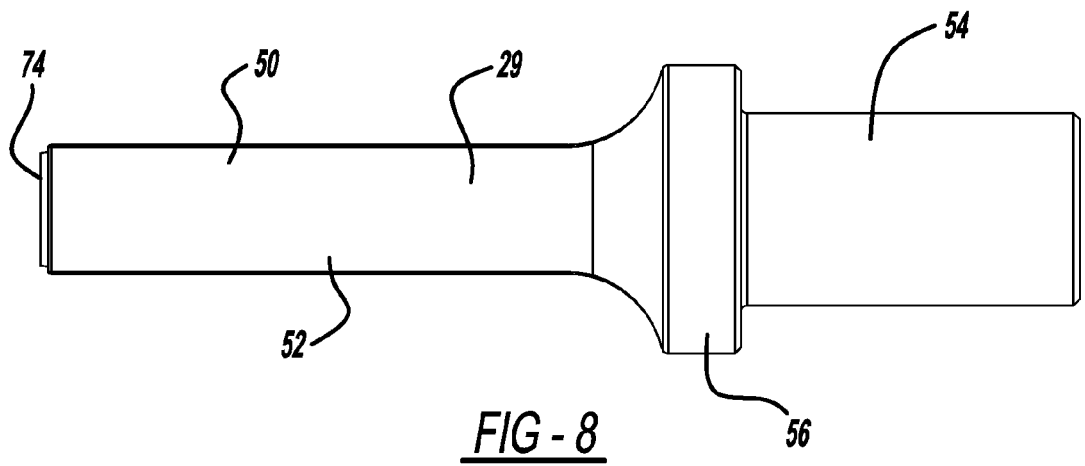
FIG. 8 is a second side view of the die of FIG. 3.
Figure 9:
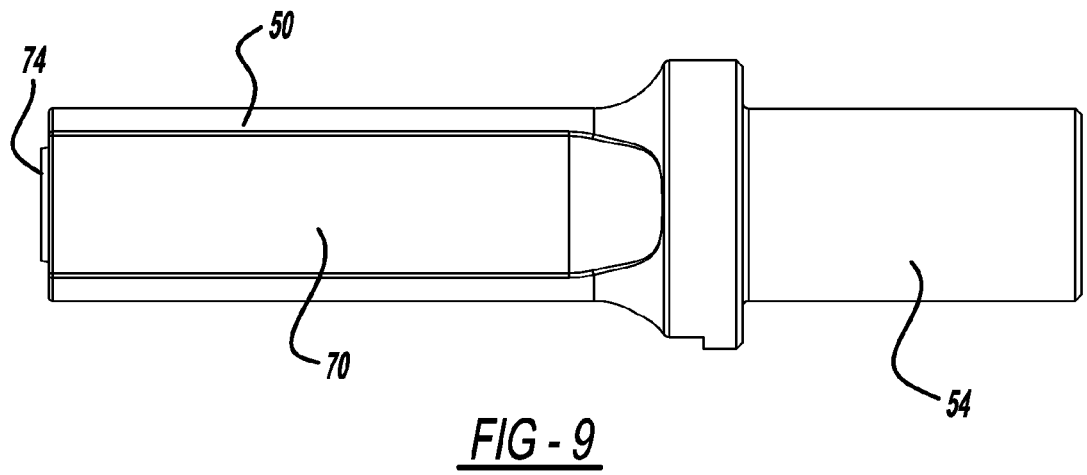
FIG. 9 is a third side view of the die of FIG. 3.

With particular reference now to FIG. 4, one of the projections 84 of the projections 82 will be described in greater detail with the understanding that the other projections 86 and 88 of the projections 82 may be constructed similarly. The flute 84 generally comprises a first converging surface 90 and a second converging surface 92. The first and second converging surfaces 90 and 92 generally cooperate to form a pie or triangular shape. In one example, the first converging surface 90 and the second converging surface 92 form an angle 98 of between 90 and 150 degrees, and more specifically, 120 degrees. The projections 82 generally initiate at the inner wall 80 that defines a first diameter 100 and terminate at a second diameter 102. According to one example of the present teachings, the first diameter 100 can be substantially about 0.266 inches and the second diameter can be about 0.246 inches. In this regard, the second diameter 102 can be substantially between 90 and 95 percent of the first diameter 100. As will be described more fully herein, the projections 82 can cooperate to retain a slug subsequent to insertion of a rivet into a workpiece. In this regard, the projections 82 of the die body 50 cooperate to inhibit a slug from unfavorably sticking to or otherwise be attached to the workpiece adjacent to a self-piercing rivet.

Turning now to FIGS. 5 and 6, additional features of the die body 50 will be described. The die body 50 defines a die chute 110 therethrough. The die chute 110 generally extends the entire length of the die body 50 through the main body portion 52, the skirt 56, and the base portion 54. The die chute 110 is generally coaxial with the opening 78. As will become appreciated from the following discussion, the die chute 110 can be configured to generally accept slugs therethrough subsequent to a rivet installation. In one example, the die chute 110 can define an inner diameter 111. The inner diameter 111 can be about 0.30 inches. The raised collar 74 includes surfaces 112 that generally converge at an angle 116. In one example, the angle 116 can be about 20 degrees. The raised collar 74 can extend proud from the end surface 72 a distance 120. The distance 120 can be about 0.025 inches.

Turning now to FIGS. 11-15, an exemplary sequence for driving a rivet 45 into a first and second workpiece 142 and 144, respectively will be described. The rivet 45 is a self-piercing rivet. FIG. 11 generally illustrates a rivet 45 intermediate the nosepiece 35 (as well as the punch 37) and the die 29. FIG. 12 illustrates the first and second workpieces 142 and 144, respectively being located generally between the die 29 and the nosepiece 35 (as well as the punch 37). In one example, the second workpiece 144 can be located against the raised collar 74. As is generally known in the art, the self-piercing rivet 45 can be driven through the first and second workpieces 142 and 144 to join the first and second workpieces 142 and 144 together.

Figure 14:
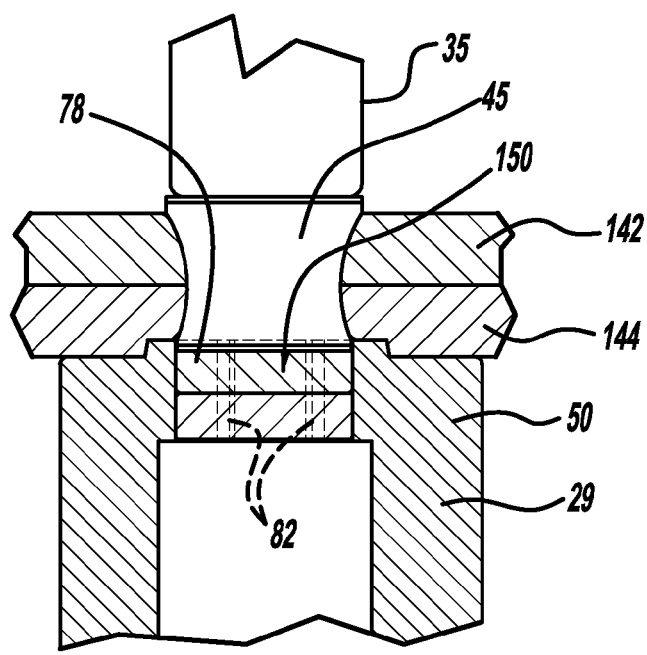
Figure 17:
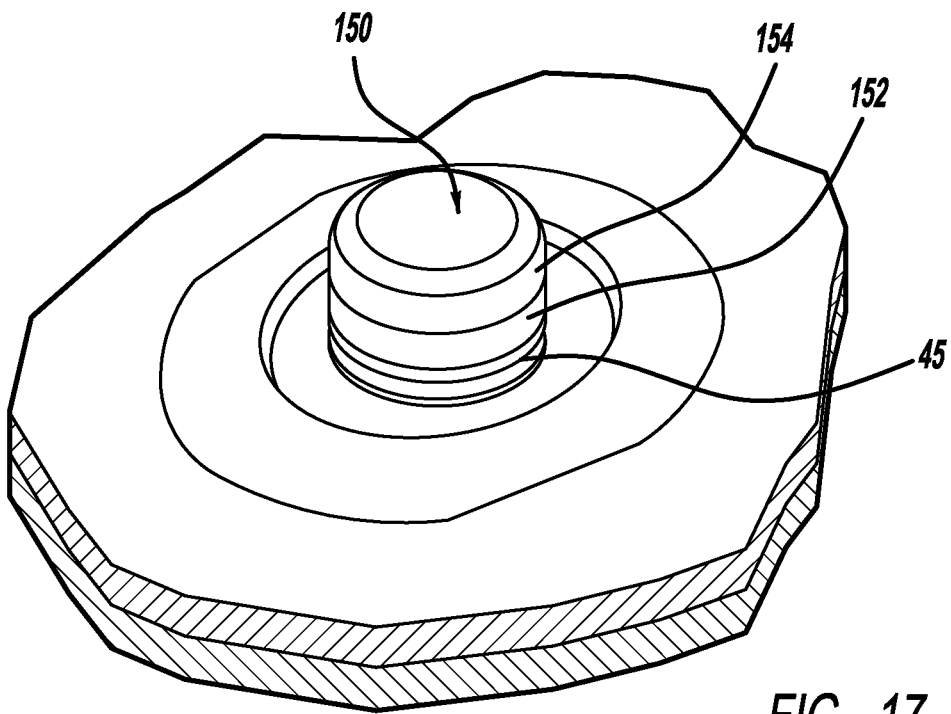
FIG. 17 is a prior art view of a slug that has remained attached to a newly introduced rivet.

FIG. 13 illustrates the punch 37 initially driving the rivet 45 through the first workpiece 142 and partially into the second workpiece 144. The driving of the rivet 45 into the first and second workpieces 142 and 144 creates a slug generally identified at reference numeral 150. The slug 150 generally comprises a first slug portion 152 and a second slug portion 154. As can be appreciated, the first slug portion 152 includes material from the first workpiece 142 while the second slug portion 154 includes material from the second workpiece 144. As shown in FIG. 14, the rivet 45 has been driven through the second workpiece 144 causing the slug 150 to be generally received into the opening 78 of the die body 50. At this point, an outer surface of the slug 150 is engaged by the projections 82 extending from the inner wall 80 of the die body 50. The projections 82 cooperate to generally retain the slug 150 within the opening 78. In this regard, when the workpieces 142 and 144 are shifted away carrying the newly introduced rivet 45, the slug 150 is specifically retained by the opening 78 in the die body 50 such that the slug 150 is inhibited from sticking to or otherwise being captured against the newly introduced rivet 45 (as illustrated in FIG. 17).

Figure 15:
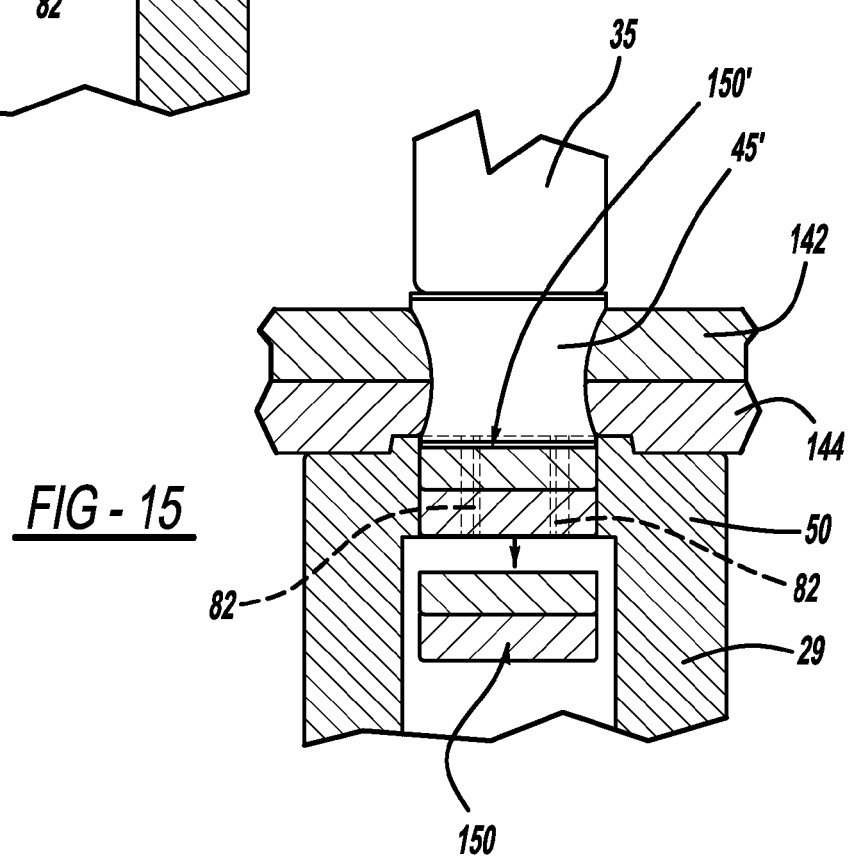
Figure 16:
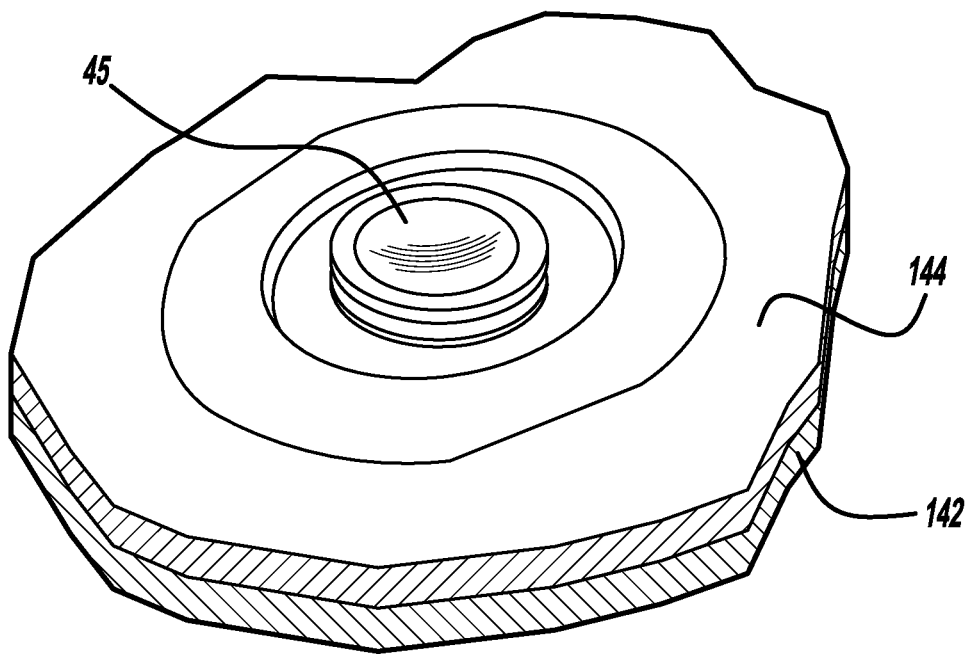
FIG. 16 is a perspective view of a rivet shown driven into the first and second workpiece according to the present teachings.

With reference to FIG. 15, a subsequent rivet 45' is shown being introduced through the first and second workpieces 142 and 144. In one example, the workpieces 142 and 144 may have been shifted away from alignment between the punch 37 and the die 29 carrying the previously introduced rivet 45. The subsequent rivet, identified at reference numeral 45' can drive a new slug identified at reference numeral 150' into the opening 78 of the die body 50. The new slug 150' will tend to urge the previously retained slug 150 into the die chute 110, where it may be collected with other slugs in the sequence. The process then repeats itself with each subsequent rivet introduction. In some examples, a vacuum may be attached to the die body 50 for drawing air through the die chute 110 in a direction generally from the opening 78 at the main body portion 52 in a direction toward the base portion 54. FIG. 16 illustrates the rivet 45 installed into the workpieces 142 and 144.

Figure 18:
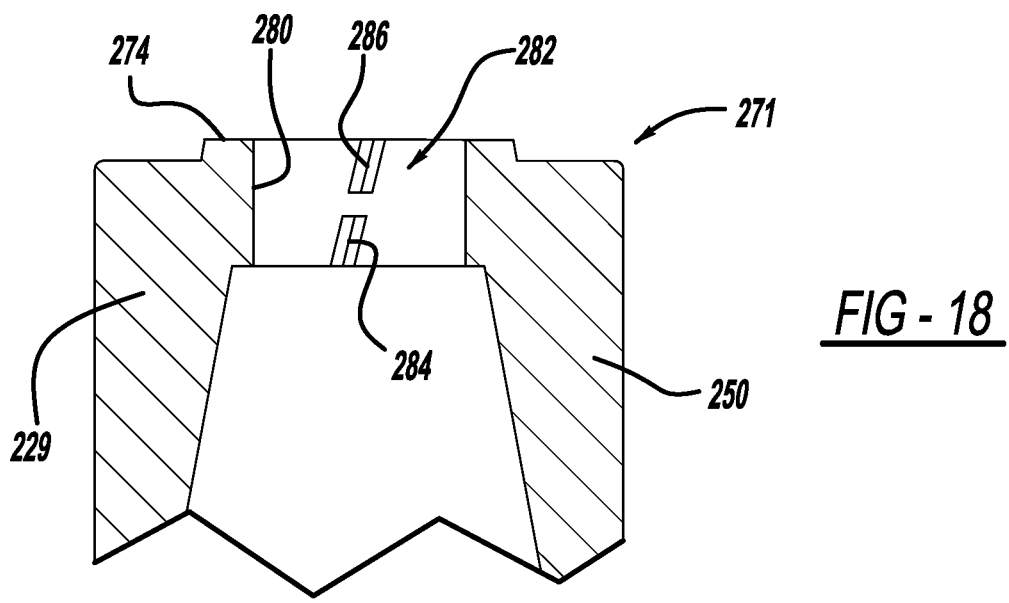
FIG. 18 is a cross-sectional view of a die button constructed in accordance to additional features of the present teachings.
Figure 19:
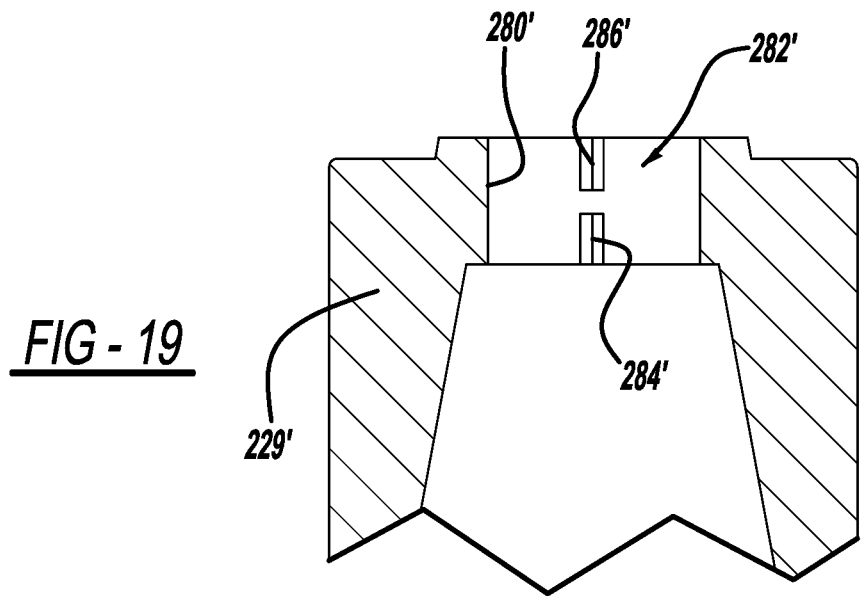
FIG. 19 is a cross-sectional view of a die button constructed in accordance to other features of the present teachings.

FIG. 18 illustrates a die 229 constructed according to additional features. The die 229 includes a die body 250 and die button 271. The die button 271 has a raised collar 274. An opening 278 is generally defined by a bore 279 having an inner wall 280. Projections, collectively identified at 282 extend inwardly from the inner wall 280. The projections 282 can include a first projection 284 that is discontinuous from a second projection 286. The projections 282 can extend at an angle relative to an axis of the inner wall 280. Projections 282' having first projection portion 284' and second projection portion 286' are shown in a die 229' configuration in FIG. 19. The projections 282' are parallel to an axis of an inner wall 280'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rivet machine comprising:
   a rivet;
   a punch; and
   a die including a die body having an inner wall that defines an opening, the inner wall comprising a generally cylindrical shape with at least one pair of fixed projections extending inwardly therefrom, wherein the rivet pushes a slug from a workpiece within which the slug is mounted and into the opening, against the inner wall wherein said body further includes a longitudinal chute being a through opening in which multiple slugs are passed through the through opening.

2. The rivet machine of claim 1 wherein the at least one pair of projections comprise diametrically opposed projections.

3. The rivet machine of claim 1 wherein the at least one pair of projections comprise at least one projection having two converging surfaces.

4. The rivet machine of claim 3 wherein the two converging surfaces comprise a first and a second surface that form an angle of between 90 and 150 degrees.

5. The rivet machine of claim 4 wherein the first and second surfaces form an angle of 120 degrees.

6. The rivet machine of claim 3 wherein the at least one pair of projections comprises two projections each having two planar surfaces that converge.

7. The rivet machine of claim 3 wherein the at least one pair of projections comprises three pair of projections.

8. The rivet machine of claim 7 wherein each pair of the three pairs of projections comprise diametrically opposed projections.

9. The rivet machine of claim 2 wherein the pair of projections initiate from a first diameter of the inner wall and terminate at a second diameter of the inner wall, wherein the second diameter is less than the first diameter.

10. The rivet machine of claim 9 wherein the second diameter is substantially between 90 and 95 percent of the first diameter.

11. The rivet machine of claim 1 wherein the rivet is a self-piercing rivet.

12. The rivet machine of claim 1 wherein the at least one pair of projections are discontinuous wherein each projection of the pair of projections are formed by a first projection longitudinally offset from a second projection.

13. The rivet machine of claim 12 wherein the at least one pair of discontinuous projections are non-parallel relative to a longitudinal axis of the die body.

14. A rivet machine comprising:
a rivet;
a punch; and
a die including a die button having a fixed inner wall that defines an opening for receiving a slug, the inner wall comprising a bore having first and second openings that defines an axis, the bore having at least one pair of retaining ribs extending from the inner wall in a direction toward the axis, wherein the rivet pushes the slug from a workpiece within which the slug is mounted and into the opening to a position at least partially within the bore, and in contact with the retaining ribs, and wherein the slug from the workpiece remains at least partially within the bore until a subsequent rivet pushes a subsequent slug into the bore such that the subsequent slug substantially pushes the slug out from the second opening of said bore.

15. The rivet machine of claim 14 wherein the at least one pair of retaining ribs comprises a first and a second retaining rib, each having a first and a second converging surface that form an angle of between 90 and 150 degrees.

16. The rivet machine of claim 15 wherein the first and second converging surfaces form an angle of 120 degrees.

17. The rivet machine of claim 14 wherein the at least one pair of retaining ribs comprises three pair of diametrically opposed retaining ribs.

18. The rivet machine of claim 14 wherein the at least one pair of retaining ribs initiate from a first diameter of the inner wall and terminate at a second diameter of the inner wall, wherein the second diameter is less than the first diameter.

19. The rivet machine of claim 18 wherein the second diameter is substantially between 90 and 95 percent of the first diameter.

20. The rivet machine of claim 14 wherein the rivet is a self-piercing rivet.

21. The rivet machine of claim 14 wherein the at least one pair of retaining ribs are discontinuous wherein each retaining rib of the pair of retaining ribs are formed by a first retaining rib portion longitudinally offset from a second retaining rib portion.

22. The rivet machine of claim 21 wherein the at least one pair of discontinuous retaining ribs are non-parallel relative to axis of the bore.

23. A rivet machine comprising:
a self-piercing rivet;
a punch that cycles from a first position to a second position causing the self-piercing rivet to be driven into a workpiece and a slug to be expelled from the workpiece within which it the slug is mounted; and
a die including a die button having an inner wall that defines an opening for receiving a slug, the inner wall comprising a bore that defines an axis, the bore having at least one pair of fixed and diametrically opposed retaining ribs extending from the inner wall in a direction toward a second opening of the die positioned along the axis, wherein the slug is directed into the opening to a position at least partially within the bore, and in contact with the at least one pair of retaining ribs, wherein the punch stops from entering the opening in the second position.

24. The rivet machine of claim 23 wherein the at least one pair of retaining ribs comprises a first and a second retaining rib, each having a first and a second converging surface that form an angle of between 90 and 150 degrees.

25. The rivet machine of claim 24 wherein the first and second converging surfaces form an angle of 120 degrees.

26. The rivet machine of claim 23 wherein the at least one pair of retaining ribs comprises three pair of diametrically opposed retaining ribs.

27. The rivet machine of claim 23 wherein the at least one pair of retaining ribs initiate from a first diameter of the inner wall and terminate at a second diameter of the inner wall, wherein the second diameter is less than the first diameter.

28. The rivet machine of claim 27 wherein the second diameter is substantially between 90 and 95 percent of the first diameter.

* * * * *

UNITED STATES PATENT AND TRADEMARK OFFICE
CERTIFICATE OF CORRECTION

PATENT NO. : 8,769,789 B2
APPLICATION NO. : 13/162986
DATED : July 8, 2014
INVENTOR(S) : Robert G. Bathurst Page 1 of 1

It is certified that error appears in the above-identified patent and that said Letters Patent is hereby corrected as shown below:

In the Specification:

Column 1, line 34;
   "advantageous" should be --advantages--.
Column 1, line 66;
   "workpiece" should be --workpieces--.

In the Claims:

Column 6, claim 17, line 2, second occurrence;
   "pair" should be --pairs--.
Column 6, claim 23, line 27;
   Delete "it".
Column 6, claim 26, line 46, second occurrence;
   "pair" should be --pairs--.

Signed and Sealed this
Twentieth Day of January, 2015

Michelle K. Lee
*Deputy Director of the United States Patent and Trademark Office*